UNITED STATES PATENT OFFICE.

IVAN LEVINSTEIN, OF MANCHESTER, ENGLAND, ASSIGNOR TO COMPANY OF LEVINSTEIN LIMITED, OF MANCHESTER, ENGLAND.

PRODUCTION OF SULFONATED PALMITIC PRODUCTS.

1,185,213.

Specification of Letters Patent. Patented May 30, 1916.

No Drawing. Application filed February 17, 1914. Serial No. 819,170.

*To all whom it may concern:*

Be it known that I, IVAN LEVINSTEIN, a subject of the King of Great Britain and Ireland, and a resident of Manchester, in the county of Lancaster, England, have invented new and useful Improvements in and Relating to the Production of Sulfonated Palmitic Products, of which the following is a specification.

This invention relates to improvements in the production of sulfo acids from pure palmitic acid or palmitin or from palmitic acid or from palmitin in its commercial or technical form. The palmitic sulfo acids and their salts produced according to this invention in themselves possess the known property of being soluble or emulsifiable in, or miscible with, water, and also possesses the remarkable property of forming compounds with fats, greases, or waxes, which compounds are similarly soluble, emulsifiable or miscible in water.

In Lewkovitch's *Chemical Technology of Oils, Fats, and Waxes* (1909 edition vol. 1, page 127) and in "*Chemie der Fette Lipoide und Wachsarten*" by Glikin (1912 edition, vol. 1, page 208) it is stated that palmitic acid dissolves in sulfuric acid, but that when the solution is diluted with water palmitic acid is precipitated unchanged, namely, as palmitic acid. A large number of experiments I have made have not only confirmed this fact, but they have also shown that palmitic acid alone cannot be converted into its sulfo acid by any method hitherto known for the sulfonation of oils, etc. I have found, however, that if pure palmitic acid or palmitin be treated with sulfuric acid in the presence of an added oil, fat, wax or grease which is capable of giving a sulfo acid, then such treatment results in the production of a palmitic sulfo acid concurrently with the production of the sulfo acid of the added fat, oil, or the like. The palmitic sulfo acid so produced is not precipitated by water but is soluble or miscible therein together with the other sulfo acid contained in the compound. The compounds produced by sulfonation according to this invention very much resemble in their properties, especially as regards emulsifying waxes, the compounds produced from oils or the like which naturally contain palmitic acid as described in the specification to my prior British Letters Patent No. 18333/12. However, a sulfo compound according to my present invention will, generally speaking, emulsify and render perfectly miscible in water considerably more than an equal weight of paraffin wax, and in some instances as much as six times its weight of paraffin wax.

That the miscible or soluble compound of palmitic acid is really a palmitic sulfo acid is proved by the facts that palmitic acid is itself insoluble in water while the sulfo compounds are soluble; that sulfo compounds of palmitic acid will when mixed with fats, waxes, or the like render such fats, waxes, or the like miscible or soluble, and that the sulfonated compounds produced according to this invention will similarly render fats waxes or the like miscible or soluble, even when the oil, fat, or the like which is concurrently treated with the palmitic acid, itself produces a sulfo compound which will not render waxes, fats, or the like soluble or miscible. According to my present invention palmitic acid in either its pure or in its technical or commercial form such as, for example, Japan wax or palm oil, is melted with a vegetable or animal oil or fat or grease which need not naturally contain such acid at all, or in any substantial quantity. This mixture of palmitin or palmitic acid with such an oil or fat is treated while still in the liquid or melted condition with sulfuric acid, preferably 100% H$_2$SO$_4$ (monohydrate). The resulting sulfo acids are quickly washed free of mineral acid or are quickly neutralized. They or their salts may then be melted with a suitable wax, such as, for example, paraffin wax, or with an oil or fat to produce compounds which are emulsifiable, soluble or miscible.

Example 1: Melt together 1 part of pure palmitic acid with one part of technical oleic acid or olein and cool down to 40° C. Take 200 grams of this mixture and slowly add to it about 50 grams of sulfuric acid stirred well all the time. The temperature is maintained during sulfonation at about 40° C. Then prepare 1000 grams salt solution (10° Tw.) warm to 30° C. and pour the sulfonation melt, under agitation, into the salt solution. Allow to settle, run off the salt solution, wash again with warm salt solution, or neutralize with soda or other suitable alkali. The free sulfo acid thus obtained from palmitic and oleic acid is itself soluble or miscible in water, and makes a like compound when melted, for example, with paraffin wax. When the free sulfo acid is used the smallest quantity of ammonia will facilitate the emulsion, keeping the mixture still acid. The partly neutralized or neutral salts are practically soluble in water. As an example the partly neutralized combined sulfo acids will emulsify six times its weight of paraffin wax.

Example 2: Equal parts of maize oil and pure palmitic acid are melted together and afterward cooled to 42° C. To 200 grams of this mixture are gradually added 50 grams of 100% $H_2SO_4$. The sulfonation temperature is 50° C. otherwise the procedure is as stated in Example 1. The free sulfo acid or its salts form emulsifiable compounds with waxes. The partly neutralized salt (acid) is practically soluble in water.

Example 3: 30 grams of pure palmitic acid are melted together with 40 grams of fish oil, and after cooling to 40° C. 18 grams $H_2SO_4$ (monohydrate) are slowly run in and the temperature kept at 45–50° C. until a sample of the sulfonation melt is miscible with water. Otherwise the method of procedure is exactly the same as stated in Example 1.

Example 4: 1 part of pure palmitic acid is melted with two parts castor oil. The sulfonation temperature is 45–50° C. Otherwise the procedure is exactly as stated in Example 1. The resulting sulfo acids are practically soluble in water and emulsify equal parts of paraffin wax without the addition of any alkali.

Example 5: Equal parts of palm oil and commercial oleic acid are melted together and afterward cooled to 30° C. with continuous stirring. To 200 parts of this mixture are gradually added 50 parts 100% $H_2SO_4$. The sulfonation temperature is 30–35° C. Otherwise the procedure is as stated in Example 1.

Example 6: Equal parts of Japan wax and commercial oleic acid are melted together and afterward cooled to 35° C. with continuous stirring. To 200 parts of this mixture are gradually added 50 parts of 100% $H_2SO_4$. The sulfonation temperature is 35° C. Otherwise the procedure is as stated in Example 1.

Example 7: Equal parts of palm oil and wool grease are melted together and afterward cooled to 35° C. with continuous stirring. To 200 parts of this mixture are gradually added 50 parts of 100% $H_2SO_4$. The sulfonation temperature is 35–40° C. Otherwise the procedure is as stated in Example 1.

Example 8: Equal parts of Japan wax and commercial stearic acid (stearin) are melted together and afterward cooled to 40° C. with continuous stirring. To 200 parts of this mixture are gradually added 50 parts of 100% $H_2SO_4$. The sulfonation temperature is 40–45° C. Otherwise the procedure is as stated in Example 1.

Example 9: Equal parts of palm oil and commercial stearic acid are melted together and afterward cooled to 40° C. with continuous stirring. To 200 parts of this mixture are gradually added 50 parts 100% $H_2SO_4$. The sulfonation temperature is 40–45° C. Otherwise the procedure is as stated in Example 1.

Instead of paraffin wax or other waxes such as for example bees' wax or carnauba wax may be similarly mixed with the palmitic sulfo compounds, as also may be greases or fats such as tallow. They all become miscible with water on compounding with the new sulfo acids. The acid, neutral, or alkaline salts may be used in place of the sulfo acids. The neutralization or partial neutralization of the said sulfo acids is preferably effected after mixing with the wax or the like.

The proportions, the strength of the sulfuric acid, and the temperatures, may be varied, but I prefer to work as stated above. The test as to whether the sulfonation has been carried out properly, is that a sample taken from the sulfonation melt is miscible in hot water. The proportions of palmitic acid with other oils in combination may also be varied to produce certain technical effects.

In the above examples the palmitin or palmitic acid has been described as being melted with a single oil or the like for treatment with sulfuric acid. If desired two or more oils or the like may be mixed with the palmitin or palmitic acid.

In the claims it is intended that both palmitin and palmitic acid will be included in a reference to palmitic acid; that the generic term "fat" will cover either solid fat, fatty oil, grease, or the like; that the term "wax" will be sufficiently broad to cover such compounds as are generally covered by this term in the standard authorities, and that a miscible, soluble or emulsifiable compound will be covered under the general term of "miscible compound."

What I claim is:—

1. The production of a sulfonated compound by concurrently treating with sulfuric acid a mixture of palmitic acid and an added fat or wax, substantially as set forth.

2. A sulfonated compound containing a mixture of sulfonated palmitic acid and an added fat or wax, substantially as set forth.

3. The production of a miscible compound of a fat or wax by admixture of the fat or wax with a sulfonated compound produced by concurrently treating with sulfuric acid a mixture of palmitic acid and an added fat or wax, substantially as set forth.

4. A miscible compound containing a fat or wax and a mixture of sulfonated compounds of palmitic acid and added fat or wax, substantially as described.

5. The process of producing a sulfonated compound which consists in concurrently treating with sulfuric acid a mixture of palmitic acid and an added fat or wax, and then partially neutralizing at least the sulfonated product thus obtained.

6. The process of producing a miscible compound of a fat or wax, which consists in concurrently treating with sulfuric acid a mixture of palmitic acid and an added fat or wax, and in then partially neutralizing at least the sulfonated product thus obtained, and finally mixing the neutralized sulfonated product with a fat or wax.

7. The process of producing sulfonated compounds which consists in concurrently treating a mixture of palmitic acid and an added fat or wax with sulfuric acid, and in then pouring the sulfonated product into a salt solution, and thereafter running off the salt solution.

8. The process of producing a sulfonated compound which consists in concurrently treating a mixture of palmitic acid and an added fat or wax with sulfuric acid, then pouring the sulfonated product thus obtained into a salt solution, running off the salt solution and partially neutralizing at least the remaining sulfonated product.

In witness whereof I have hereunto set my hand in the presence of two subscribing witnesses.

IVAN LEVINSTEIN.

Witnesses:
WILLIAM GEO. HAYS,
GEORGE WEAVER.